United States Patent [19]
Jones

[11] Patent Number: 5,809,311
[45] Date of Patent: Sep. 15, 1998

[54] SYSTEM AND METHOD FOR PROVIDING CENTRALIZED BACKUP POWER IN A COMPUTER SYSTEM

[75] Inventor: Craig Steven Jones, Lago Vista, Tex.

[73] Assignee: Dell U.S.A., L.P., Round Rock, Tex.

[21] Appl. No.: 664,978

[22] Filed: Jun. 14, 1996

Related U.S. Application Data

[63] Continuation-in-part of Ser. No. 274,933, Jul. 14, 1994, abandoned.

[51] Int. Cl.⁶ ........................................................ G06F 1/30
[52] U.S. Cl. ...................... 395/750.01; 395/375; 361/90; 364/200; 364/707; 364/492
[58] Field of Search .................................... 395/750, 375; 361/90; 364/707, 200

[56] References Cited

U.S. PATENT DOCUMENTS

| | | |
|---|---|---|
| 4,506,323 | 3/1985 | Pusic et al. . |
| 4,651,020 | 3/1987 | Kenny et al. . |
| 4,868,832 | 9/1989 | Marrington et al. . |
| 4,878,196 | 10/1989 | Rose . |
| 5,012,406 | 4/1991 | Martin . |
| 5,167,024 | 11/1992 | Smith et al. ............................ 395/375 |
| 5,204,963 | 4/1993 | Noya et al. ............................ 395/750 |
| 5,239,495 | 8/1993 | Nanno et al. ........................... 364/707 |
| 5,247,623 | 9/1993 | Sun . |
| 5,283,905 | 2/1994 | Saadeh et al. .......................... 395/750 |
| 5,327,172 | 7/1994 | Tan et al. . |
| 5,379,435 | 1/1995 | Hanaoka . |
| 5,396,637 | 3/1995 | Harwell et al. . |
| 5,412,529 | 5/1995 | Eaton et al. ............................. 361/90 |
| 5,553,294 | 9/1996 | Nanno et al. ........................... 395/750 |
| 5,566,339 | 10/1996 | Perholtz et al. ........................ 395/750 |
| 5,572,438 | 11/1996 | Ehlers et al. ........................... 364/492 |

Primary Examiner—Ayaz R. Sheikh
Assistant Examiner—Eric S. Thlang
Attorney, Agent, or Firm—Haynes and Boone, L.L.P.

[57] ABSTRACT

In a computer system having a plurality of electronic subsystems therein adapted to receive main electrical power from an interruptible main power supply, ones of the electronic subsystems being designated as critical to retention of user data in the computer system in an event of interruption of the electrical power from the main power supply, a backup power subsystem and method for controllably delivering backup electrical power to the ones of the electronic subsystems. The subsystem comprises: (1) a central electrical power storage cell having a particular capacity and adapted to be maintained in a constantly charged state, (2) a backup electrical power bus coupled to the central electrical power storage cell and adapted to be selectively coupled to selected ones of the electronic subsystems and (3) a backup power management controller adapted to couple the backup electrical power bus to the selected ones of the electronic subsystems.

45 Claims, 2 Drawing Sheets

SYSTEM AND METHOD FOR PROVIDING CENTRALIZED BACKUP POWER IN A COMPUTER SYSTEM

CROSS REFERENCE TO RELATED APPLICATIONS

This application is a continuation in part of patent application Ser. No. 08/274,933, entitled "System and Method for Providing Centralized Backup Power in a Computer System," filed Jul. 14, 1994 now abandoned.

TECHNICAL FIELD OF THE INVENTION

The present invention is directed, in general, to a backup power subsystem for a computer system and, more specifically, to a backup power subsystem that includes a centralized backup electrical power cell and controller and a bus for allowing centralized collection of operating status data into the controller.

BACKGROUND OF THE INVENTION

Immeasurable gains in technology offered in personal computers ("PCs") have allowed PCs to assume roles performed only by mainframe or minicomputers in the past. Many companies and individual users rely solely on commercially-available PCs to meet their information processing needs. Thus, it is vital that their PCs perform reliably. The fault tolerance of a given computer system is a sensitive issue with companies and individual users given the level of reliance they place on their computer systems.

Initially PCs were stand-alone devices, each containing separate hardware, operating system, application software and user data. However, as use of PCs spread within business organizations, the need for shared data and hardware resources grew, and local area network ("LANs") came into being. A LAN (or its more-geographically-dispersed counterpart, the wide area network ("WAN")) comprises a number of PCs ("clients") linked to one another (typically by a high speed serial communications link) and centers around a relatively high performance PC (a "server") that delivers application programs and data to the clients and manages system-wide resources, such as secondary storage units and printers.

The LAN concept has proven useful, but suffers from a few disadvantages. First, since management of the LAN is focussed in the server, the overall performance of the LAN is compromised when the server becomes a processing bottleneck. Second, and also due to the fact that the server is the focus of the LAN, if the server fails, the LAN also fails. Failure of the LAN may result in data loss and almost certainly results in valuable time being lost.

One possible source of LAN server failure is interruption of line power to the server. If line power is lost, any data stored in volatile memory are lost. This loss may be particularly critical when, for instance, the LAN employs write-back caching to increase server performance.

Since secondary storage (or disk) access times are generally far in excess of main memory access times, it has become an accepted practice to provide a disk cache memory to hold data temporarily before the data are actually written to disk. Data can be read from or written to the cache memory rapidly. If the cache memory is configured as write-through, data are written to the disk and the cache memory simultaneously. However, if the cache memory is configured as write-back, data are written only to the cache memory and the contents of the cache memory only periodically written (or "flushed") to the disk. If power fails when the cache memory holds data that have not yet been written to disk, that data are lost.

Since the contents of main memory are also lost in a power failure, the state of the server prior to power failure is lost. Thus, even though no data may be irretrievably lost, the contents of main memory must be reassembled following restoration of power to bring the server back to the state in which it was prior to failure.

Other functions may also require backup power in the event of line power loss, thereby making other systems critical to operation in the event of power loss. For example, an operating status of some components may indicate that cooling fans are needed to continue operation and to prevent overheating of the components. Modems, network interface cards ("NICs") or other out-of-band devices may require power to allow remote access to determine server condition. Remote server reset circuitry requires power to perform its function. It is understood, however, that systems deemed critical to operation are determined for each system, and the present invention does not try to predict which systems will be deemed critical in the future.

To prevent data loss or the attendant inconvenience of server state loss, prior art computers have included uninterruptible power supplies ("UPSs"). A UPS is a unit containing a battery, a recharge circuit and a rapid detection and switching circuit that is plugged into line power and into which the server is plugged. The recharge circuit maintains the battery in a ready state. If line power is interrupted, the detection and switching circuit detects the loss of line power and switches to battery power without substantial delay. Thus, power to the server is maintained, at least for a limited time, to allow data contained in cache and main memory to be flushed to nonvolatile memory and other appropriate remedial actions to be taken.

It has also become standard practice to provide, in lieu of a UPS, separate battery backup for the several subsystems constituting the server. Thus, the write-back cache has its own associated battery. The main memory also has a battery to enable the server state to be saved, if such is desired.

Unfortunately, the above-described solution of employing separate battery backups for each subsystem has significant disadvantages. First, the separate batteries may be size-limited, since they are physically placed proximate each associated subsystem. Second, the separate batteries must be individually charged and monitored to maintain integrity. Third, separate detection and switching circuits are required for each subsystem.

Accordingly, what is needed in the art are a system and method for providing centralized backup power in a computer system. It is also highly desirable to provide a means by which data concerning an operating status of each of the several electronic subsystems in the computer system can be remotely monitored.

SUMMARY OF THE INVENTION

To address the above-discussed deficiencies of the prior art, it is a primary object of the present invention to provide a system and method for providing centralized backup power in a computer system including a controller for directing the centralized backup power to vital subsystems.

In the attainment of the above primary object, the present invention provides a backup power subsystem and method for controllably delivering backup electrical power to electronic subsystems in a computer system. The subsystem and method are designed to operate in the environment of a computer system having a plurality of electronic subsystems therein adapted to receive main electrical power from an interruptible main power supply, ones of the electronic subsystems being designated as critical in the computer system in an event of interruption of the electrical power from the main power supply. The subsystem comprises: (1) a central electrical power storage cell having a particular capacity and adapted to be maintained in a constantly charged state, (2) a system management bus coupled to the central electrical power storage cell and adapted to be selectively coupled to selected ones of the electronic subsystems and (3) a backup power management controller adapted to couple the backup electrical power bus to the selected ones of the electronic subsystems. The backup power management controller also monitors the electronic subsystems by receiving operating status data from each subsystem and selects which electronic subsystems will receive backup power. The operating status includes, without limitation, data that indicates a condition of the subsystem. The computer system provides in-band or out-of-band access to the backup power management controller through a LAN or remote device, respectively. The computer system may be a LAN server, but need not be.

A principal advantage of the present invention is that delivery of backup power is focussed in a centralized backup power system employing a central backup power source and a backup power management controller to control routing of the backup power within the computer. This is in contrast to prior art backup power systems involving separate backup power sources for each of the electronic subsystems requiring backup power and failing to provide active control of backup power resources among the various subsystems.

DESCRIPTION OF THE PREFERRED EMBODIMENTS

Figure 1:
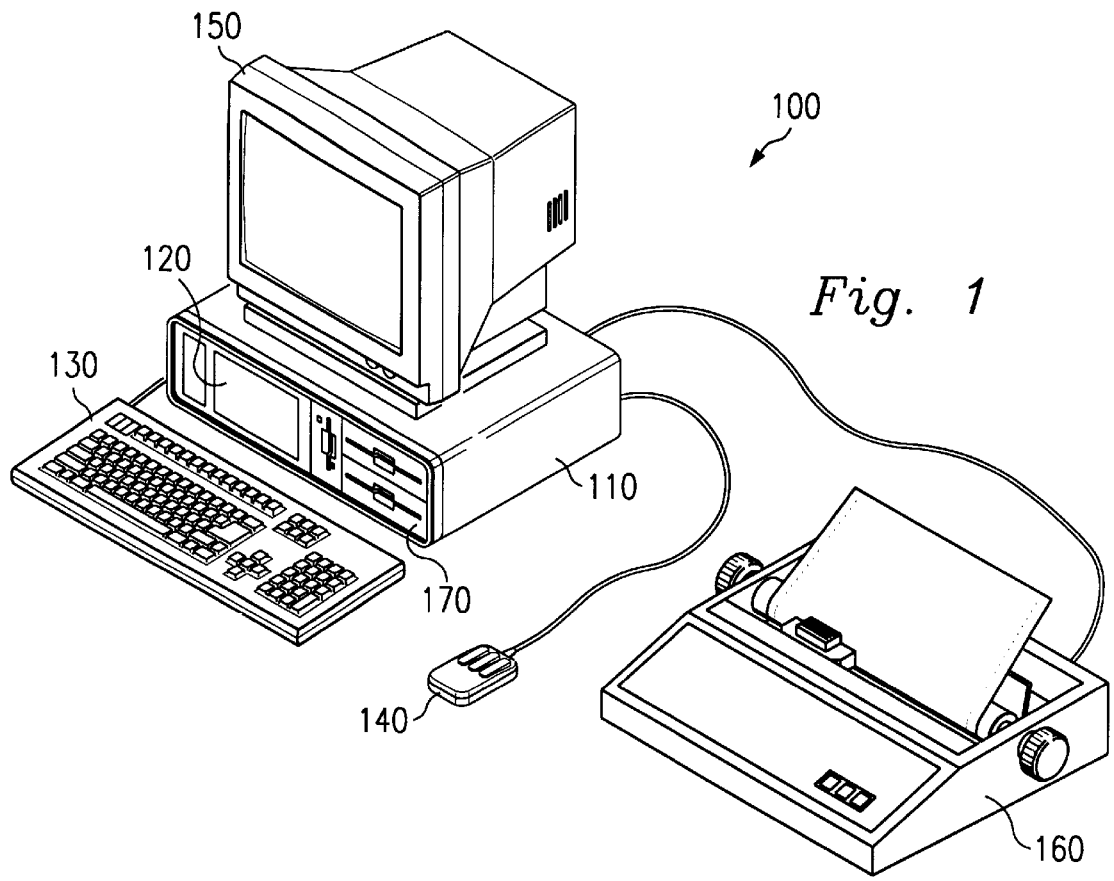
FIG. 1 illustrates an isometric view of a PC that serves as an environment within which the present invention can operate.

Referring initially to FIG. 1, illustrated is an isometric view of a PC 100 that provides an environment within which the present invention can operate. Since the present invention is not limited to application in a PC environment, however, FIG. 1 is illustrative only. The PC 100 includes a main chassis 110, a dedicated hardware reset switch 120, a keyboard 130, a mouse 140, a monitor or display device 150, a printer 160 and a disk drive 170 employed as a nonvolatile secondary storage device. The main chassis 110 houses various electronic components of the PC 100.

The display device 150 and the keyboard 130 cooperate to allow communication between the PC 100 and a user. The mouse 140 provides a means by which the user can point to data displayed on the display device 150 to take action with respect thereto.

The dedicated hardware reset switch 120 is adapted to trigger hardware reset circuitry (not shown) within the main chassis 110 to "reboot" or restart the PC 100 when the user depresses the reset switch 120. The main chassis 110 further includes a power switch (not shown) capable of interrupting power from a main electrical power source (not shown in FIG. 1) to the PC 100. Interruption and restoration of power also brings about a restart of the PC 100.

As mentioned previously, it is particularly critical to ensure against data loss in a LAN server. While the present invention can operate in any computing environment, PC LAN servers are particularly well benefitted. Therefore, the PC 100 is preferably a LAN server coupled to client PCs in a LAN in a conventional manner.

Figure 2:
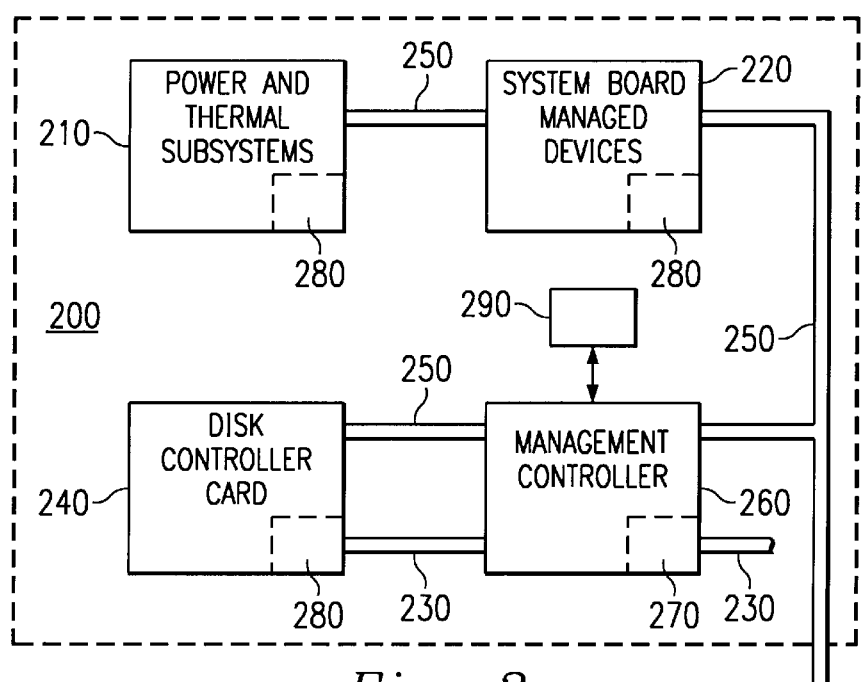
FIG. 2 illustrates a block diagram of a main system of a PC having a system management bus employing a low speed serial bus for status data collection.

Turning now to FIG. 2, illustrated is a block diagram of a main system of a PC having a system management bus employing a low speed serial bus for status data collection. The main system, generally referenced 200, contains a plurality of subsystems of the PC 100 of FIG. 1. Power and thermal subsystems 210 are directed to delivery of electrical power and removal of thermal energy from electronic components in the system 200. The power and thermal subsystems 210 include the PC's main power supply, cooling fans or other active cooling circuitry, temperature sensors and may include a UPS. The system 200 further includes system board managed devices 220, such as a disk controller, a video controller, a bus controller, a memory controller, a central processing unit ("CPU"), communications ports (parallel or serial), a control panel.

The system further includes an expansion bus 230 that may be of an industry-standard architecture ("ISA"), expanded ISA ("EISA"), peripheral connect interface ("PCI") or other conventional architecture. The expansion bus 230 is relatively slow compared to a local bus primarily responsible for handling dataflow between the CPU and main memory. The expansion bus 230 is adapted to be coupled to a user-selectable number of expansion cards, allowing the system 200 to adapt to the user's needs. For instance, a disk controller card 240 may be coupled to the expansion bus 230 to allow the system to communicate with disk drives coupled to the disk controller card 240.

FIG. 2 further illustrates a system management bus 250 coupling the power and thermal subsystems 210, the system board managed devices 220 and the disk controller card 240 to a management controller 260. The system management bus 250 allows the management controller 260 to control the power and thermal subsystems 210, the system board managed devices 220 and the disk controller card 240 independent of control by an operating system executing in the system's CPU. Preferably, the management controller 260 is embodied as an expansion card, allowing a user to insert the management controller 260 into an expansion slot of a system 200. Embodied as an expansion card, the management controller 260 is coupled to both the system management bus 250 and the expansion bus 230, as shown in FIG. 2.

Preferably, the management controller 260 comprises a data storage circuit 270 and the system management bus 250 comprise one or more bus lines adapted to transmit data concerning an operating status of the plurality of electronic subsystems (comprising the power and thermal subsystems 210, the system board managed devices 220 and the disk controller card 240) to the data storage circuit 270. Thus, the management controller 260 and system management bus 250 are provided with the capability of monitoring and gathering data concerning the operating status of the electronic subsystems 210, 220, 240 to yield a centralized system for obtaining data concerning system 200 status and performance. The management controller 260 preferably uses the gathered data to monitor and control the operation of the electronic subsystems 210, 220, 240.

Preferably, the system management bus 250 comprises a serial data bus and a backup electrical power bus. The management controller 260 operates as a dedicated bus master to monitor the electronic subsystems 210, 220, 240 by receiving the operating status data along the serial bus. Thus, the electronic subsystems 210, 220, 240 are slaves on the serial bus. This monitoring, along with a controlling of delivery of backup electrical power from a central electrical power storage cell to the electronic subsystems 210, 220, 240 (to be described in detail below), does not require transmission of data at great speeds. Therefore, the present invention makes advantageous use of a relatively simple and low cost serial bus. The serial bus may, for instance, comply with the I²C standard by the Phillips Corporation, a part of the well-known ACCESS.BUS standard.

Preferably, each of the electronic subsystems 210, 220, 240 comprises a data storage circuit 280 for temporarily storing a code representing an operating status of the each of the electronic subsystems 210, 220, 240. Each data storage circuit 280 is preferably coupled to the serial data bus to allow the operating status code to be transmitted to the management controller 260. In the illustrated embodiment, the management controller 260 polls the plurality of electronic subsystems 210, 220, 240 to receive the data concerning the operating status.

Those of ordinary skill in the art will recognize that conventional sensors, such as voltage, current, temperature sensors and the like can be coupled to elementary logic circuitry to produce a digital code that represents a state of the sensor. For instance, a temperature sensor may be placed proximate the CPU, deriving therefrom a temperature of the CPU. The analog output of the temperature sensor can be digitized in an analog to digital converter ("A/D") and the resulting digital number stored in a latch circuit (acting as the storage circuit 280). The management controller 260 polls the latch circuit via the system management bus 250 to receive the digital number. The management controller then stores the number for later remote retrieval.

Upon receipt of the digital number from each of the electronic subsystems 210, 220, 240, the management controller 260 decides which subsystems are critical. To determine which subsystems are critical, the management controller 260 compares data received from the sensors with data limits stored with the management controller. For example, if a temperature of a subsystem is above a temperature limit, a fan associated with that subsystem may be deemed as critical to the preservation of data and the operation of the PC 100.

The management controller 260 is also coupled to a remote communications device 290 adapted to allow remote monitoring and controlling of the management controller 260 by a remote user. The remote communications device may be a modem or a NIC. Although the remote user can gain access to the management controller 260 through an in-band access, e.g., using the LAN, the present invention preferably allows access using out-of-band access, e.g., using the remote communications device 290. Thus, if the system 200 is acting as a LAN server, the user need not access the management controller 260 via the LAN, but can gain access by bypassing the LAN. In bypassing the LAN, the user's access does not depend on the proper functioning of the LAN. Thus, the user can gain access to the management controller 260 while the LAN or the system 200 is not functioning.

Figure 3:
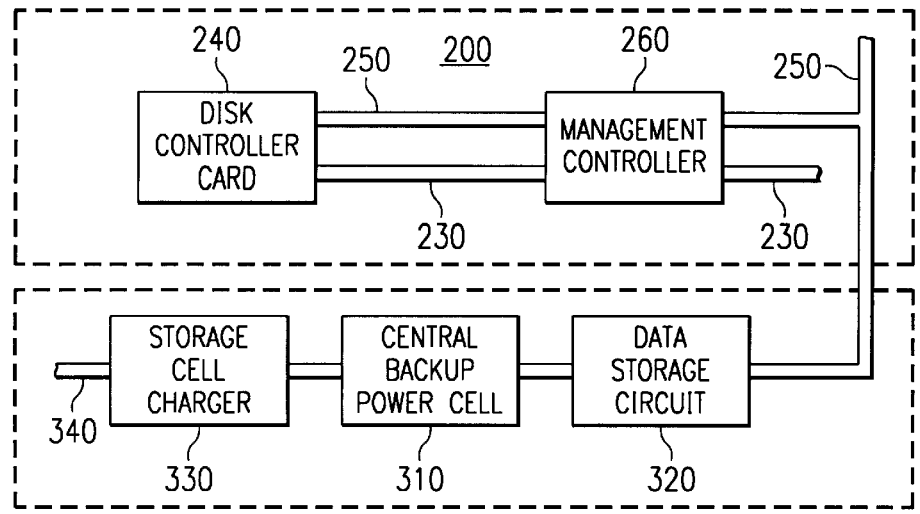
FIG. 3 illustrates a block diagram of the system management bus of FIG. 2 coupled to an externally-mounted central backup power cell according to the present invention.

Turning now to FIG. 3, illustrated is a block diagram of the system management bus 250 of FIG. 2 coupled to an externally-mounted central backup power cell 310 according to the present invention. The central backup power cell 310, in a preferred embodiment of the present invention, is a battery, and perhaps a nickel metal hydride ("NiMH") battery, such as a nickel cadmium ("NiCd") battery. Such batteries are designed to be charged and discharged many times and provide a large quantity of high quality backup power. The present invention makes use of a centralized battery to supply power to the system 200 in the event of main power failure. The management controller 260 acts as a backup power management controller, controlling the system management bus 250, which also comprises a backup electrical power bus to deliver backup power from the central backup power cell 310 to selected ones of the electronic subsystems 210, 220, 240 as required.

In the embodiment of the present invention illustrated in FIG. 3, the central electrical power storage cell 310 is located without a main system chassis housing the system 200. In another embodiment of the present invention to be illustrated in FIG. 4, the central electrical power storage cell 310 is configured as a hot-pluggable module located within a main system chassis housing the system 200. It is understood that one of ordinary skill in the art may chose one of many techniques for implementing a hot-pluggable module. For example, a switch can be positioned next to the power storage cell 310 so that if the storage cell is moved, certain electrical connections to the storage cell are disconnected.

Preferably, the management controller 260 monitors a charge state of the central electrical power storage cell 310. The management controller 260 treats the central electrical power storage cell 310 as simply another electronic subsystem. A data storage circuit 320 is therefore associated with the central electrical power storage cell 310 and is coupled to the system management bus 250 to allow polling and monitoring of the central electrical power storage cell 310.

A storage cell charger 330 is coupled to the central electrical power storage cell 310, allowing the storage cell charger 330 to maintain the central electrical power storage cell 310 in a constant substantially charged state as long as line power (coupled via a line 340 to the storage cell charger 330) is fed to the storage cell charger 330.

As previously mentioned, the central electrical power storage cell 310 is externally-mounted with respect to the main system chassis. This configuration yields three advantages. First, replacement of the central electrical power storage cell 310 is simplified. Second, the interior of the chassis is freed up for other components of the system 200. Third, the size of the central electrical power storage cell 310 is not limited by chassis or card dimensions.

Figure 4:
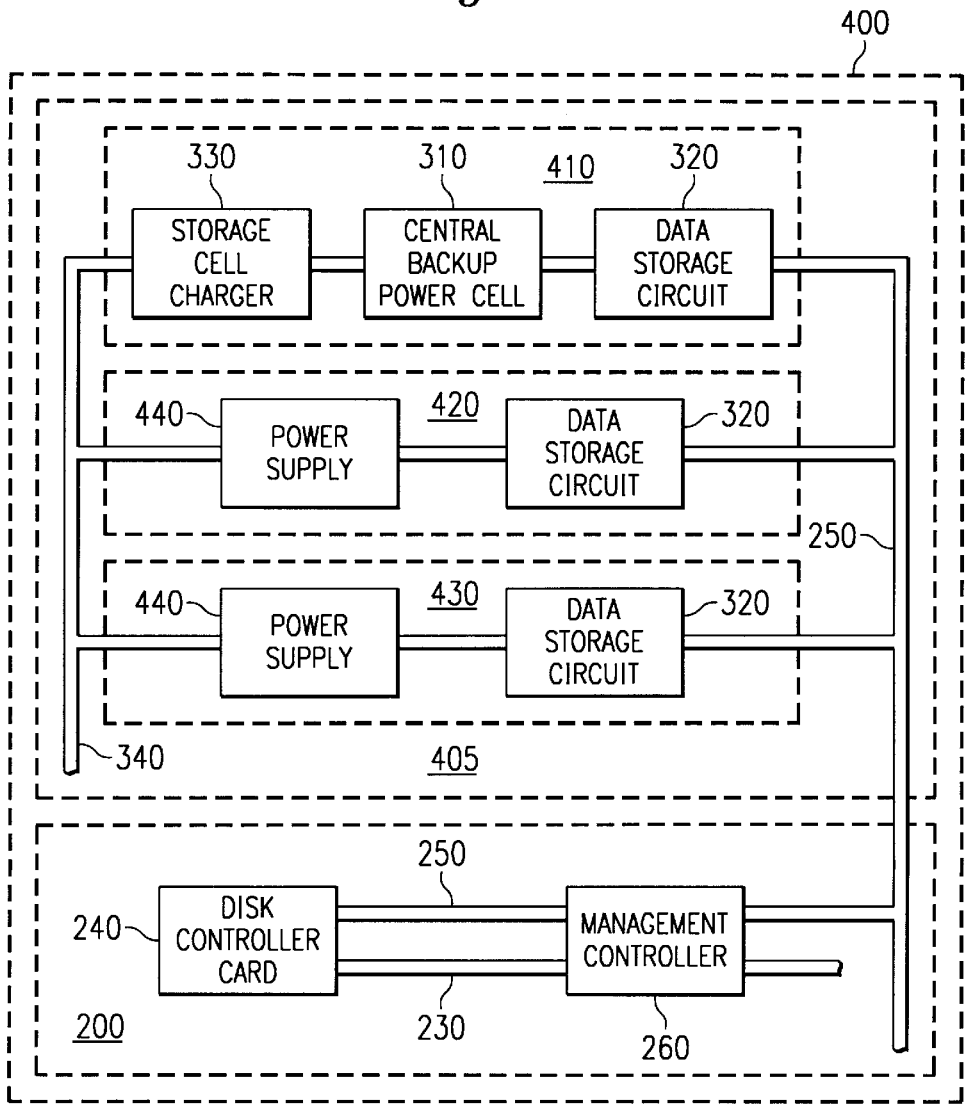
FIG. 4 illustrates a block diagram of the system management bus of FIG. 2 coupled to an internally-mounted central backup power cell according to the present invention.

Turning now to FIG. 4, illustrated is a block diagram of the system management bus 250 of FIG. 2 coupled to an internally-mounted central backup power cell 310 according to the present invention. The present invention introduces the concept of a redundant power supply 400 comprising a power supply chassis 405 and a plurality of hot-pluggable power modules 410, 420, 430 insertable into the power supply chassis 405. The term "hot-pluggable" means that the power modules 410, 420, 430 may be coupled to and decoupled from the redundant power supply 400 without having to interrupt line power to the redundant power supply 400. Thus, a user may replace defective modules or reconfigure the redundant power supply 400 as needed "on the fly," and without having to turn off the system 200.

The redundant power supply 400 is provided with a plurality of slots or bays (only schematically depicted in FIG. 4) adapted to receive either interruptible main power supplies 420, 430 (that convert line power to power suitable for use by the system 200 and cease operation if line power is interrupted) or central electrical power storage cells 410 (that use line power to maintain the central electrical power storage cell 310 in a ready state and provide backup power to the system 200 if line power is interrupted). Each of the modules 410, 420, 430 is coupled to a line 440 bringing line power to each of the modules. As before, each of the modules 410, 420, 430 has an associated storage circuit 320 to allow the management controller 260 to monitor the status of the modules 410, 420, 430.

The interruptible main power supply modules 420, 430 each comprise a power supply 440 and a data storage circuit 320, allowing the interruptible main power supplies 420, 430 to be status-monitored. The uninterruptible backup power supply module 410 comprises, as depicted previously in FIG. 3, a storage cell charger 330, a central backup power cell 310 and a data storage circuit 320. The modules 410, 420, 430 are coupled to line power via the line 340 and the system management bus 250.

From the above description, it is apparent that the present invention provides, in a computer system having a plurality of electronic subsystems therein adapted to receive main electrical power from an interruptible main power supply, ones of the electronic subsystems being designated as critical in an event of interruption of the electrical power from the main power supply, a backup power subsystem and method for controllably delivering backup electrical power to the ones of the electronic subsystems. The subsystem comprises: (1) a central electrical power storage cell having a particular capacity and adapted to be maintained in a constantly charged state, (2) a backup electrical power bus coupled to the central electrical power storage cell and adapted to be selectively coupled to selected ones of the electronic subsystems and (3) a backup power management controller adapted to couple the backup electrical power bus to the selected ones of the electronic subsystems.

Although the present invention and its advantages have been described in detail, those skilled in the art should understand that they can make various changes, substitutions and alterations herein without departing from the spirit and scope of the invention in its broadest form.

What is claimed is:

1. In a computer system having a plurality of electronic subsystems therein configured to receive main electrical power from an interruptible main power supply, a backup power subsystem for controllably delivering backup electrical power comprising:

a central electrical power storage cell having a particular capacity and configured to be maintained in a constantly charged state, wherein said central electrical power storage cell is located outside of a main system chassis of said computer system;

a backup electrical power bus coupled to said central electrical power storage cell and configured to be selectively coupled to selected ones of said electronic subsystems; and a backup power management controller adapted to monitor each of said plurality of electronic subsystems, select which of said plurality of electronic subsystems should be coupled to the backup electrical power bus and couple said backup electrical power bus only to said selected electronic subsystems.

2. In a computer system having a plurality of electronic subsystems therein configured to receive main electrical power from an interruptible main power supply, a backup power subsystem for controllably delivering backup electrical power comprising:

a central electrical power storage cell having a particular capacity and configured to be maintained in a constantly charged state, wherein said central electrical power storage cell is configured as a hot-pluggable module located within a main system chassis of said computer system;

a backup electrical power bus coupled to said central electrical power storage cell and configured to be selectively coupled to selected ones of said electronic subsystems; and a backup power management controller adapted to monitor each of said plurality of electronic subsystems, select which of said plurality of electronic subsystems should be coupled to the backup electrical power bus and couple said backup electrical power bus only to said selected electronic subsystems.

3. The backup power subsystem as recited in claim 2 wherein said backup power management controller comprises a data storage circuit and bus lines to transmit data concerning an operating status of said plurality of electronic subsystems to said data storage circuit.

4. The backup power subsystem as recited in claim 2 wherein said central electrical power storage cell is a battery.

5. The backup power subsystem as recited in claim 2 further comprising a serial data bus.

6. The backup power subsystem as recited in claim 2 wherein each of said electronic subsystems comprises a data storage circuit for temporarily storing a code representing an operating status of said each of said electronic subsystems.

7. The backup power subsystem as recited in claim 2 wherein said backup power management controller is coupled to a remote communications device adapted to allow remote monitoring of said backup power management controller.

8. The backup power subsystem as recited in claim 2 wherein said backup power management controller monitors a charge state of said central electrical power storage cell.

9. The backup power subsystem as recited in claim 2 wherein said interruptible main power supply is configured as a hot-pluggable module adapted to be removably inserted into a power supply chassis.

10. In a computer system having a plurality of electronic subsystems therein configured to receive main electrical power from an interruptible main power supply, a method of controllably delivering backup electrical power comprising the steps of:

providing a central electrical power storage cell in a location external to a main system chassis of said computer systems;

connecting a backup electrical power bus to said central electrical power storage cell;

monitoring each of said plurality of electronic subsystems to select critical electronic subsystems to receive the backup electrical power; and selectively coupling said backup electrical power bus only to said selected electronic subsystems.

11. In a computer system having a plurality of electronic subsystems therein configured to receive main electrical power from an interruptible main power supply, a method of controllably delivering backup electrical power comprising the steps of:

providing a central electrical power storage cell and maintaining said central electrical power storage cell in a constantly charged state, said central electrical power storage cell being configured as a hot-pluggable module located within a main system chassis of said computer system;

connecting a backup electrical power bus to said central electrical power storage cell;

monitoring each of said plurality of electronic subsystems to select critical electronic subsystems to receive the backup electrical power; and selectively coupling said backup electrical power bus only to said selected electronic subsystems.

12. The method as recited in claim 11 wherein said step of selectively coupling comprises the step of coupling said backup electrical power bus to said selected electronic subsystems with a backup power management controller, said backup power management controller comprising a data storage circuit and bus lines configured to transmit data concerning an operating status of said plurality of electronic subsystems to said data storage circuit.

13. The method as recited in claim 11 wherein said step of providing comprises the step of maintaining a battery having a particular capacity in a constantly charged state.

14. The method as recited in claim 11 wherein said step of connecting said backup electrical power bus to said central electrical power storage cell comprises the step of connecting said backup electrical power bus to said central electrical power storage cell.

15. The method as recited in claim 11 further comprising the step of temporarily storing a code representing an operating status of said each of said electronic subsystem in a data storage circuit in each of said electronic subsystems.

16. The method as recited in claim 11 further comprising the step of coupling said backup power management controller to a remote communications device to allow remote monitoring of said backup power management controller.

17. The method as recited in claim 11 further comprising the step of monitoring a charge state of said central electrical power storage cell with said backup power management controller.

18. The method as recited in claim 11 further comprising the step of removably inserting said interruptible main power supply and said central electrical power storage cell into a power supply chassis.

19. In a computer system having a plurality of electronic subsystems therein configured to receive main electrical power from an interruptible main power supply, a backup power subsystem comprising:

a central electrical power storage cell;

a system management bus comprising a backup electrical power bus coupled to said central electrical power storage cell and configured to be selectively coupled to selected ones of said electronic subsystems and serial bus lines to transmit data concerning an operating status of said plurality of electronic subsystems from data storage circuits associated with each of said plurality of electronic subsystems, said data storage circuits adapted to temporarily store a code representing an operating status of said plurality of electronic subsystems;

a backup power management controller adapted to couple said backup electrical power bus to said selected ones of said electronic subsystems, said backup power management controller having a data storage circuit to receive said data concerning said operating status of said plurality of electronic subsystems from said serial bus lines in order to select said selected ones of said electronic subsystems; and a remote communications device coupled to said backup power management controller and configured to allow remote monitoring of said backup power management controller.

20. The backup power subsystem as recited in claim 19 wherein said central electrical power storage cell is a battery.

21. The backup power subsystem as recited in claim 19 wherein said central electrical power storage cell is located external from a main system chassis of said computer system.

22. The backup power subsystem as recited in claim 19 wherein said central electrical power storage cell is configured as a hot-pluggable module located within a main system chassis of said computer system.

23. The backup power subsystem as recited in claim 19 wherein said backup power management controller monitors a charge state of said central electrical power storage cell.

24. The backup power subsystem as recited in claim 19 wherein said interruptible main power supply and said central electrical power storage cell are configured as hot-pluggable modules adapted to be removably inserted into a power supply chassis.

25. The backup power subsystem as recited in claim 19 wherein said remote communications device is selected from the group consisting of:

a modem, and a network interface.

26. The backup power subsystem as recited in claim 19 wherein said remote communications device allows out-of-band access to said backup power management controller.

27. The backup power subsystem as recited in claim 19 wherein said backup power management controller polls said plurality of electronic subsystems to receive said data concerning said operating status.

28. The backup power subsystem as recited in claim 19 further comprising a second interruptible main power supply configured as a hot-pluggable power conversion module adapted to be removably inserted into a power supply chassis.

29. In a computer system having a plurality of electronic subsystems therein configured to receive main electrical power from an interruptible main power supply, a method of controllably delivering backup electrical power comprising the steps of:

maintaining a central power storage cell comprising a battery having a particular capacity in a constantly charged state;

connecting a backup electrical power bus to said central electrical power storage cell, said backup electrical power bus configured to be selectively coupled to one or more critical electronic subsystems, connecting serial bus lines to transmit data concerning an operating status of said plurality of electronic subsystems from data storage circuits associated with each of said plurality of electronic subsystems, said data storage circuits configured to temporarily store a code representing an operating status of said each of said electronic subsystems;

selectively coupling said backup electrical power bus to said critical electronic subsystems with a backup power management controller, said backup power management controller having a data storage circuit to receive said data concerning said operating status of said plurality of electronic subsystems from said serial bus lines for selecting said critical electronic subsystems; and remotely monitoring said backup power management controller with a remote communications device coupled to said backup power management controller.

30. In a computer system having a plurality of electronic subsystems therein configured to receive main electrical power from an interruptible main power supply, a method of controllably delivering backup electrical power comprising the steps of:

maintaining in a constantly charged state a central power storage cell configured as a hot-pluggable module located within a main system chassis of said computer;

connecting a backup electrical power bus to said central electrical power storage cell, said backup electrical power bus configured to be selectively coupled to one or more critical electronic subsystems;

connecting serial bus lines to transmit data concerning an operating status of said plurality of electronic subsystems from data storage circuits associated with each of said plurality of electronic subsystems, said data storage circuits configured to temporarily store a code representing an operating status of said each of said electronic subsystems;

selectively coupling said backup electrical power bus to said critical electronic subsystems with a backup power management controller, said backup power management controller having a data storage circuit to receive said data concerning said operating status of said plurality of electronic subsystems from said serial bus lines for selecting said critical electronic subsystems; and remotely monitoring said backup power management controller with a remote communications device coupled to said backup power management controller.

31. The method of claim 30 further comprising the step of locating said central electrical power storage cell outside of a main system chassis of said computer system.

32. The method of claim 30 further comprising the step of monitoring a charge state of said central electrical power storage cell with said backup power management controller.

33. The remote communications device of claim 30 selected from a group consisting of:
a modem, and
a network interface.

34. The method of claim 30 further comprising the step of providing out-of-band access to said backup power management controller with said remote communications device.

35. The method of claim 30 further comprising the step of polling said plurality of electronic subsystems with said backup power management controller to receive said data concerning said operating status.

36. In a computer system having a plurality of electronic subsystems therein configured to receive main electrical power from an interruptible main power supply, a method of controllably delivering backup electrical power comprising the steps of:

maintaining in a constantly charged state a central power storage cell having a particular capacity;

connecting a backup electrical power bus to said central electrical power storage cell, said backup electrical power bus configured to be selectively coupled to one or more critical electronic subsystems;

connecting serial bus lines to transmit data concerning an operating status of said plurality of electronic subsystems from data storage circuits associated with each of said plurality of electronic subsystems, said data storage circuits configured to temporarily store a code representing an operating status of said each of said electronic subsystems;

selectively coupling said backup electrical power bus to said critical electronic subsystems with a backup power management controller, said backup power management controller having a data storage circuit to receive said data concerning said operating status of said plurality of electronic subsystems from said serial bus lines for selecting said critical electronic subsystems;

remotely monitoring said backup power management controller with a remote communications device coupled to said backup power management controller; and inserting said interruptible main power supply and said central electrical power storage cell into a power supply chassis.

37. The method of claim 36 comprising the step of replacing the main power supply with a second interruptible main power supply configured as a hot-pluggable power conversion module by removing the main power supply and inserting the second interruptible main power supply into the power supply chassis.

38. In a computer system having a plurality of electronic subsystems therein configured to receive main electrical power from an interruptible main power supply, a backup power subsystem for controllably delivering backup electrical power to selected ones of said electronic subsystems, comprising:

a battery having a particular capacity and adapted to be maintained in a constantly charged state, said battery being located outside of a main system chassis of said computer system;

a system management bus coupled to said battery and configured to deliver the backup power to said selected ones of said electronic subsystems and to poll and transmit data concerning an operating status of said plurality of electronic subsystems from data storage circuits associated with each of said plurality of electronic subsystems, said data storage circuits configured to temporarily store a code representing an operating status of said each of said electronic subsystems;

a backup power management controller configured to couple said system management bus to said selected ones of said electronic subsystems, said backup power management controller having a data storage circuit to receive said data concerning said operating status of said plurality of electronic subsystems for determining said selected ones of said electronic subsystems and monitoring a charge state of said battery; and a remote communications device coupled to said backup power management controller and configured to allow out-of-band access and remote monitoring of said backup power management controller.

39. In a computer system having a plurality of electronic subsystems therein configured to receive main electrical power from an interruptible main power supply, a backup power subsystem for controllably delivering backup electrical power to selected ones of said electronic subsystems, comprising:

a battery having a particular capacity and adapted to be maintained in a constantly charged state, said battery being configured as a hot-pluggable module located within a main system chassis of said computer system;

a system management bus coupled to said battery and configured to deliver the backup power to said selected ones of said electronic subsystems and to poll and transmit data concerning an operating status of said plurality of electronic subsystems from data storage circuits associated with each of said plurality of electronic subsystems, said data storage circuits configured to temporarily store a code representing an operating status of said each of said electronic subsystems;

a backup power management controller configured to couple said system management bus to said selected ones of said electronic subsystems, said backup power management controller having a data storage circuit to receive said data concerning said operating status of said plurality of electronic subsystems for determining said selected ones of said electronic subsystems and monitoring a charge state of said battery; and a remote communications device coupled to said backup power management controller and configured to allow out-of-band access and remote monitoring of said backup power management controller.

40. The backup power subsystem as recited in claim 39 wherein said remote communications device is selected from the group consisting of:

a modem, and a network interface.

41. The backup power subsystem as recited in claim 39 further comprising a second interruptible main power supply configured as a hot-pluggable power conversion module adapted to be removably inserted into a power supply chassis.

42. In a computer system having a plurality of electronic subsystems therein adapted to receive main electrical power from an interruptible main power supply, a method of controllably delivering backup electrical power to one or more critical electronic subsystems, comprising the steps of:

maintaining a battery having a particular capacity in a constantly charged state, said battery being located external from a main system chassis of said computer system;

connecting a system management bus to said battery, said system management bus adapted to be selectively coupled to provide backup electrical power to said critical electronic subsystems and adapted to poll and transmit data concerning an operating status of said plurality of electronic subsystems from data storage circuits associated with each of said plurality of electronic subsystems, said data storage circuits adapted to temporarily store a code representing an operating status of said each of said electronic subsystems;

selectively coupling said system management bus to said critical electronic subsystems with a backup power management controller, said backup power management controller having a data storage circuit adapted to receive said data concerning said operating status of said plurality of electronic subsystems from said system management bus for selecting said critical electronic subsystems and monitoring a charge state of said battery;

remotely monitoring said backup power management controller with an out-of-band remote communications device coupled to said backup power management controller.

43. In a computer system having a plurality of electronic subsystems therein adapted to receive main electrical power from an interruptible main power supply, a method of controllably delivering backup electrical power to one or more critical electronic subsystems, comprising the steps of:

maintaining a battery having a particular capacity in a constantly charged state, said battery being configured as a hot-pluggable module located within a main system chassis of said computer system;

connecting a system management bus to said battery, said system management bus adapted to be selectively coupled to provide backup electrical power to said critical electronic subsystems and adapted to poll and transmit data concerning an operating status of said plurality of electronic subsystems from data storage circuits associated with each of said plurality of electronic subsystems, said data storage circuits adapted to temporarily store a code representing an operating status of said each of said electronic subsystems;

selectively coupling said system management bus to said critical electronic subsystems with a backup power management controller, said backup power management controller having a data storage circuit adapted to receive said data concerning said operating status of said plurality of electronic subsystems from said system management bus for selecting said critical electronic subsystems and monitoring a charge state of said battery; and remotely monitoring said backup power management controller with an out-of-band remote communications device coupled to said backup power management controller.

44. The remote communications device of claim 43 selected from a group consisting of:

a modem, and a network interface.

45. The method of claim 43 further comprising the step of removably inserting a second interruptible main power supply configured as a hot-pluggable power conversion module into a power supply chassis.

* * * * *